United States Patent [19]

Hashizume et al.

[11] 3,834,651

[45] Sept. 10, 1974

[54] CASSETTE TAPE RECORDER

[75] Inventors: Shin Hashizume, Mito; Takashi Kubota, Katsuta; Katsuo Usui, Katsuta; Hitoshi Ogasahara, Katsuta, all of Japan

[73] Assignee: Hitachi, Ltd., Tokyo, Japan

[22] Filed: Mar. 19, 1973

[21] Appl. No.: 342,413

[30] Foreign Application Priority Data

Mar. 21, 1972 Japan .............................. 47-27388

[52] U.S. Cl. .......... 242/199, 274/4 C, 179/100.2 Z

[51] Int. Cl..... G03b 1/04, G11b 15/32, G11b 23/04

[58] Field of Search ........................... 242/199–204; 274/4 C, 4 D, 11 C; 35/35; 179/100.2 Z, 100.2 R

[56] References Cited

UNITED STATES PATENTS

| | | | |
|---|---|---|---|
| 3,531,575 | 9/1970 | Kobler et al. | 35/35 |
| 3,718,777 | 2/1973 | Tupaj et al. | 179/100.2 R |
| 3,724,859 | 4/1973 | Kobler et al. | 274/4 D |

*Primary Examiner*—Leonard D. Christian
*Attorney, Agent, or Firm*—Craig & Antonelli

[57] ABSTRACT

A cassette tape recorder comprising a first motor for effecting a constant speed advance of a tape in a cassette and a second motor for effecting a fast advance of the tape, the second motor being adapted to be energized when the tape end is reached during the constant speed tape advancing operation, so as to terminate the constant speed advance.

9 Claims, 11 Drawing Figures

PATENTED SEP 10 1974 3,834,651

SHEET 5 OF 7

CASSETTE TAPE RECORDER

BACKGROUND OF THE INVENTION

1. Field of the Invention

The present invention relates to a cassette tape recorder, and more particularly to a cassette tape recorder of such a type that uses a tape cassette comprising a housing which includes a pair of rotatable hubs having opposite ends of a tape respectively secured thereto for alternately taking it up so as to control the advancing movement of the tape.

2. Description of the Prior Art

Conventionally, a cassette tape recorder includes only one drive motor which includes an output shaft having a motor pulley secured thereto. An endless belt is disposed so as to pass around the motor pulley and a fly wheel and a take up pulley is always in driving contact with the belt. A fast advance roller is always in contact with the fly wheel and an endless belt is so disposed that it passes around the fast advance roller and a fast advance pulley. Thus, when the recorder is energized, the fly wheel, the take up pulley and the fast advance pulley are started to rotate. Then, a play button is depressed to cause the take up pulley to be displaced so as to move a further pulley which is integrally formed therewith into contact with a turn table. Thus, the tape is advanced. When either of a fast advance button and a take back button is depressed, the fast advance pulley is rotated in either direction to cause an idler integrally formed therewith to move into contact with the turn table, so that the tape is advanced at a faster rate or taken back.

In the conventional arrangement, the fast advance pulley and the idler are rotatably mounted on a first advance arm which is in turn rotatably mounted on an operating board, so that complicated work is required in assembling the apparatus and thus the manufacturing cost is increased.

SUMMARY OF THE INVENTION

The present invention has an object to provide a cassette tape recorder in which a fast tape feed such as a fast tape advance and take back can be performed with a simple mechanism.

Another object of the present invention is to provide a cassette tape recorder in which a tape can be automatically stopped at the end of a playing operation or a constant speed advance of the tape.

A further object of the present invention is to provide a cassette tape recorder in which a tape can be automatically stopped at the end of a fast feed of the tape.

DESCRIPTION OF THE PREFERRED EMBODIMENTS

Figure 1:
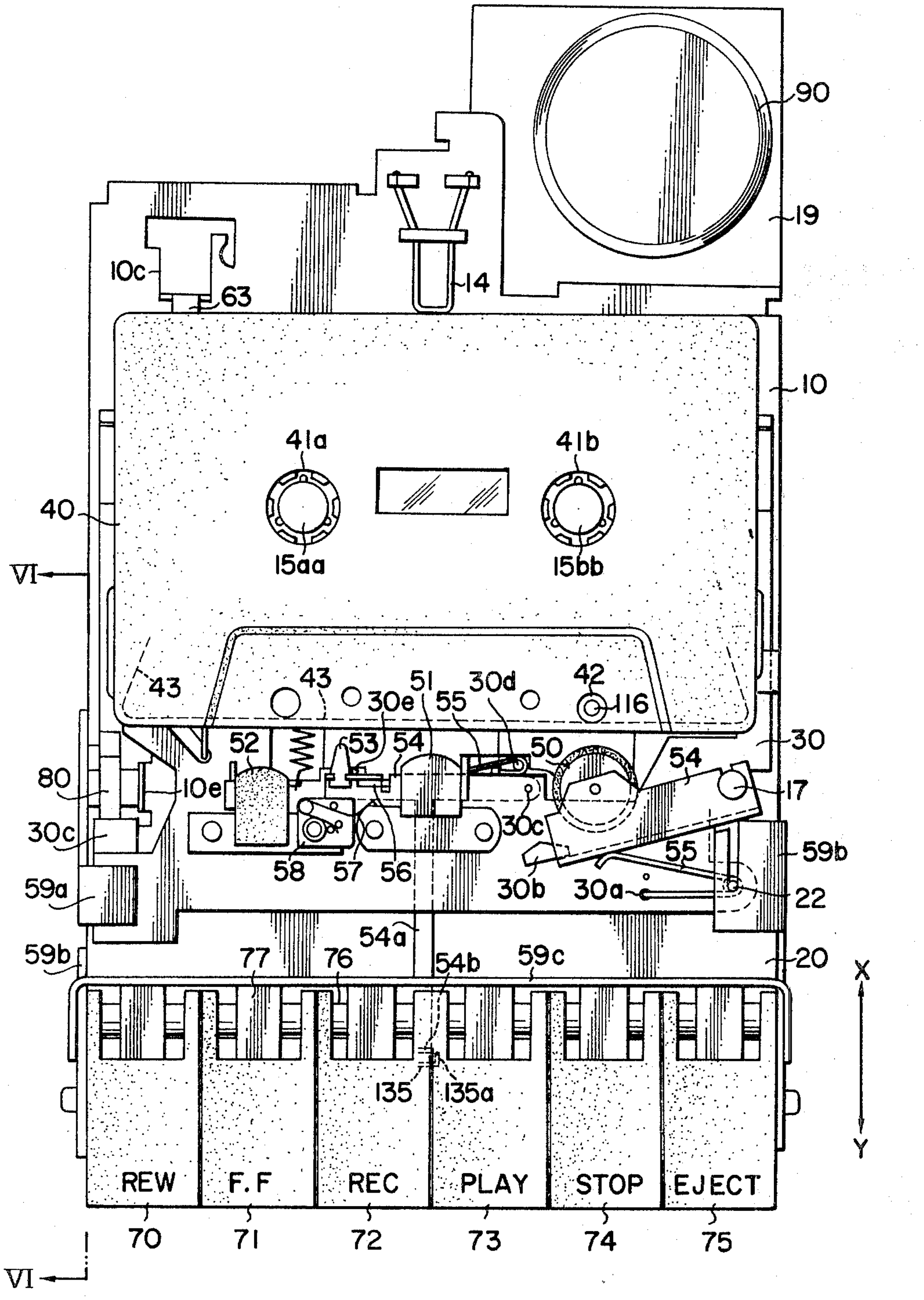
FIG. 1 is a plan view of a cassette tape recorder in accordance with one embodiment of the present invention with a cassette inserted therein and the tape recorder in a stopped position.
Figure 2:
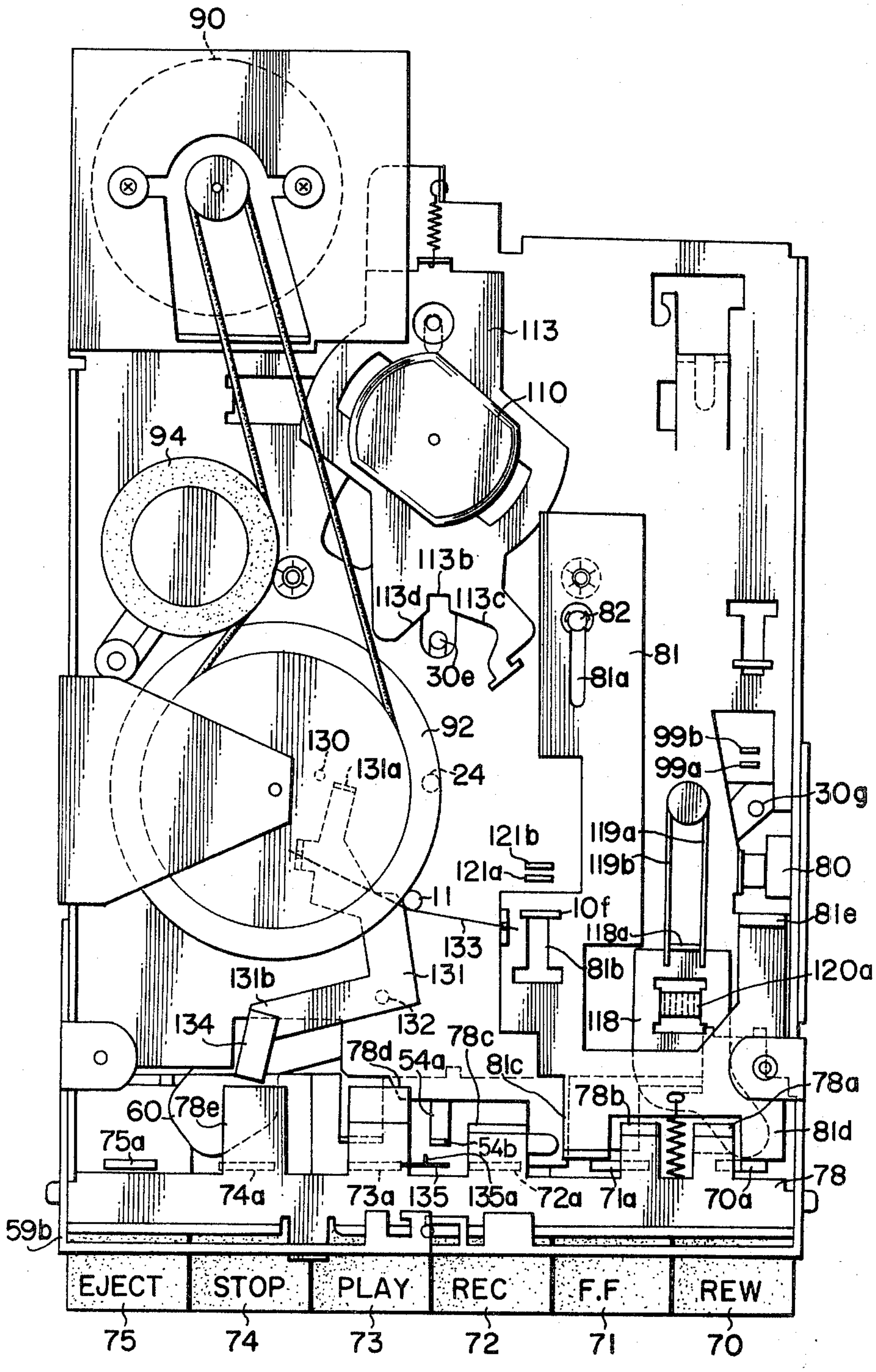
FIG. 2 is a bottom view of the tape recorder shown in FIG. 1.
Figure 3:
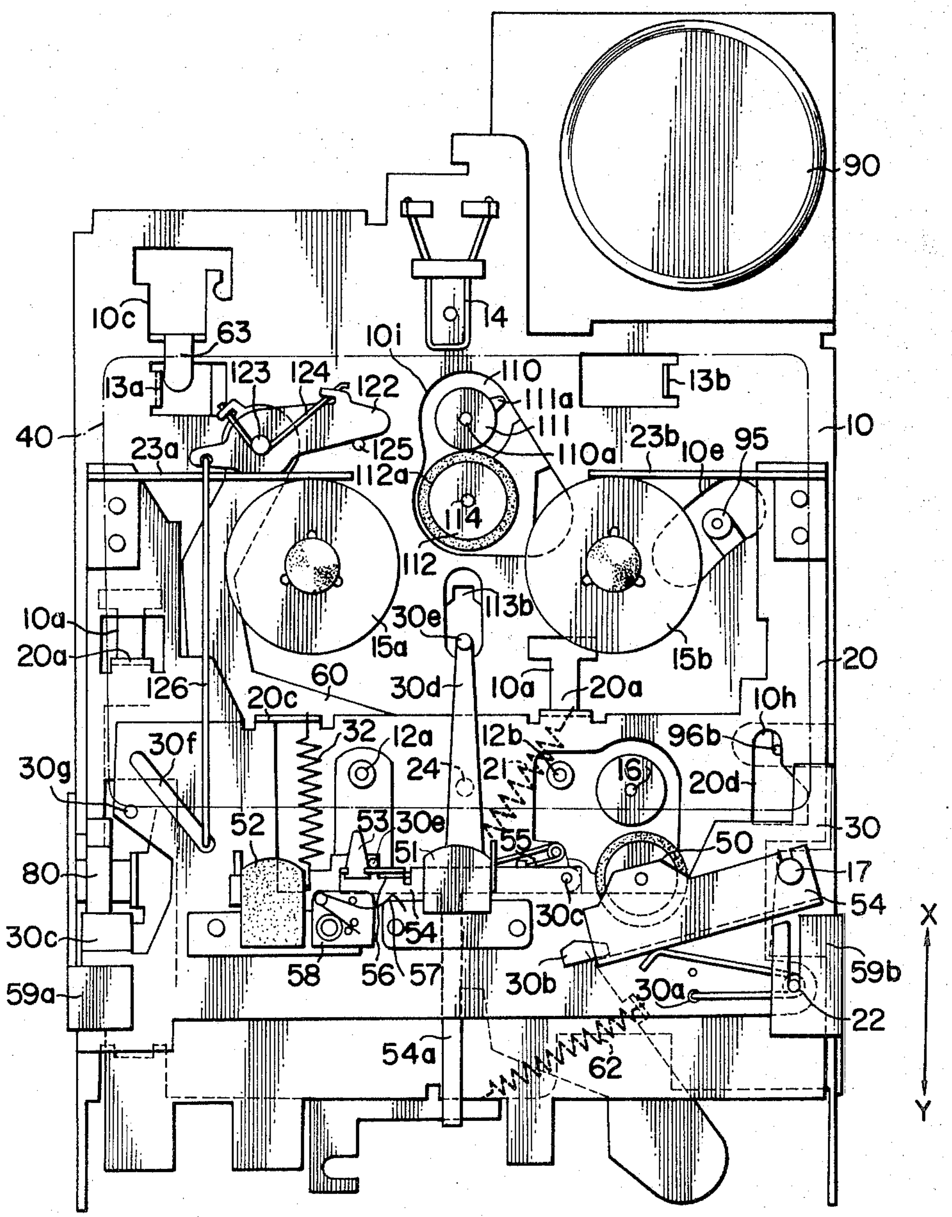
FIG. 3 is a plan view of the tape recorder shown in FIG. 1 with the cassette and push buttons removed in order to show the interior.

Referring to the drawings, FIG. 1 shows a tape recorder which has a tape cassette mounted thereon and which is shown in a stop position, FIG. 2 shows a bottom view thereof and FIG. 3 is a plan view thereof showing the cassette by a dotted line in order to show parts under the cassette. The tape recorder includes a stationary member 10 on which a movable member 20 is disposed. Further, a platform member 30 is disposed on the movable member 20. The movable member 20 has a pair of depending portions **20*a* and 20*b* at its forward portion as shown in FIG. 3, which are inserted into corresponding holes 10*a* and 10*b* in the stationary member 10 in order to support the movable member 20 movably in the direction X – Y on the stationary member 10 with a slight clearance therebetween. A spring 21 is disposed so as to extend between the lower end of the depending portion 20*b* and a pin 11 secured to the back side of the stationary member 10 so as to bias the movable member 20 in the direction shown by an arrow Y in FIG. 2. The platform member 30 is mounted on the movable member 20 by a pin 22 secured thereto so that the member 30 is rotatable around the pin 22. A spring 32 extends between the left hand forward end of the platform member 30 and an upwardly bent portion 20*c* formed on the movable member 20, so that the left hand forward end of the platform member 30 is normally biased into contact with the portion 20*c***.

A cassette 40 is mounted in position by means of guide pins **12*a* and 12*b* secured to the stationary member 10, upwardly directed lug portions 13*a* and 13*b* and a spring 14. The cassette 40 has a pair of cores provided with holes 41*a* and 41*b*, respectively which are adapted to engage with upwright stubs 14*aa* and 14*bb* on turn tables 15*a* and 15*b*. The cassette 40 further includes an opening 42 formed at the right hand forward portion for receiving a capstan 16. The turn table 15*a* and 15*b* are rotatably mounted on the stationary member 10, and the capstan 16 is also rotatably mounted on the stationary member 10 and extends downwardly beyond the member 10. As in a conventional arrangement, the cassette 40 includes a tape 43 which is secured at its opposite ends to the cores (not shown) in the cassette 40 so as to be taken up around the cores. A portion of the length of the tape 43 is exposed along the front wall 44 of the cassette 40**.

As in a conventional arrangement, a pinch roller 50, a recording and reproducing head 51, an erasing head 52 and a detecting piece 53 are disposed at a level below the cassette 40. The stationary member 10 has at its right hand lower side a pin 17 which rotatably supports an end of a pinch roller arm 54. The pinch roller 50 is rotatably mounted on the arm 54 at the left side portion thereof. A spring 55 is supported at its intermediate portion by a pin 22 secured to the platform member 30 and has one end engaging with a hole 30*a* formed in the platform member 30 and the other end with the free end portion of the arm 54, so as to urge the arm 54 in the clockwise direction. The clockwise rotation of the arm 54 is limited by a stopper 30*b* formed on the platform member 30 engaging with a depending lug portion formed on the arm 54. The head 51 is securely mounted on the platform member 30 at the left hand side of the pinch roller 50. Similarly, the erasing head 52 is mounted on the member 30 at the left hand side of the head 51. The detecting piece 53 is disposed between the heads 51 and 52 by being secured to one end of a substantially T-shaped arm 54, the other end of the arm 54 being rotatably mounted on a pin 30 *c* downwardly extending from the member 30. A spring 55 is supported at its intermediate portion round a pin 30*d* provided on the platform member 30, and has one end engaging with the member 30 and the other end with the free end of the arm 54 so as to bias the arm in the clockwise direction, the clockwise rotation of the arm 54 being limited by the stopper 30*e* on the platform member 30. A printed circuit board 56 is secured to the arm 54 at the side opposite to the detecting piece 53. A lead wire 57 is disposed in an opposed relation to the circuit board 56 and secured to a guide member 58 which has a plurality of poles integrally mounlded therewith for securing the wire 57 thereto. The movable member 20 has opposite sides extending upwardly adjacent to the sides of the turn tables 15*a* and 15*b* for supporting adjacent ends of brake discs 23*a* and 23*b*. The other ends of the brake discs are in engagement with the upper portions of the turn tables 15*a* and 15*b*. The movable member 20 is further guided at its lower portion as seen in FIGS. 1 through 3 by a pair of guide members 59*a* and 59*b* which engage with the opposite sides of the member 20.

Figure 4:
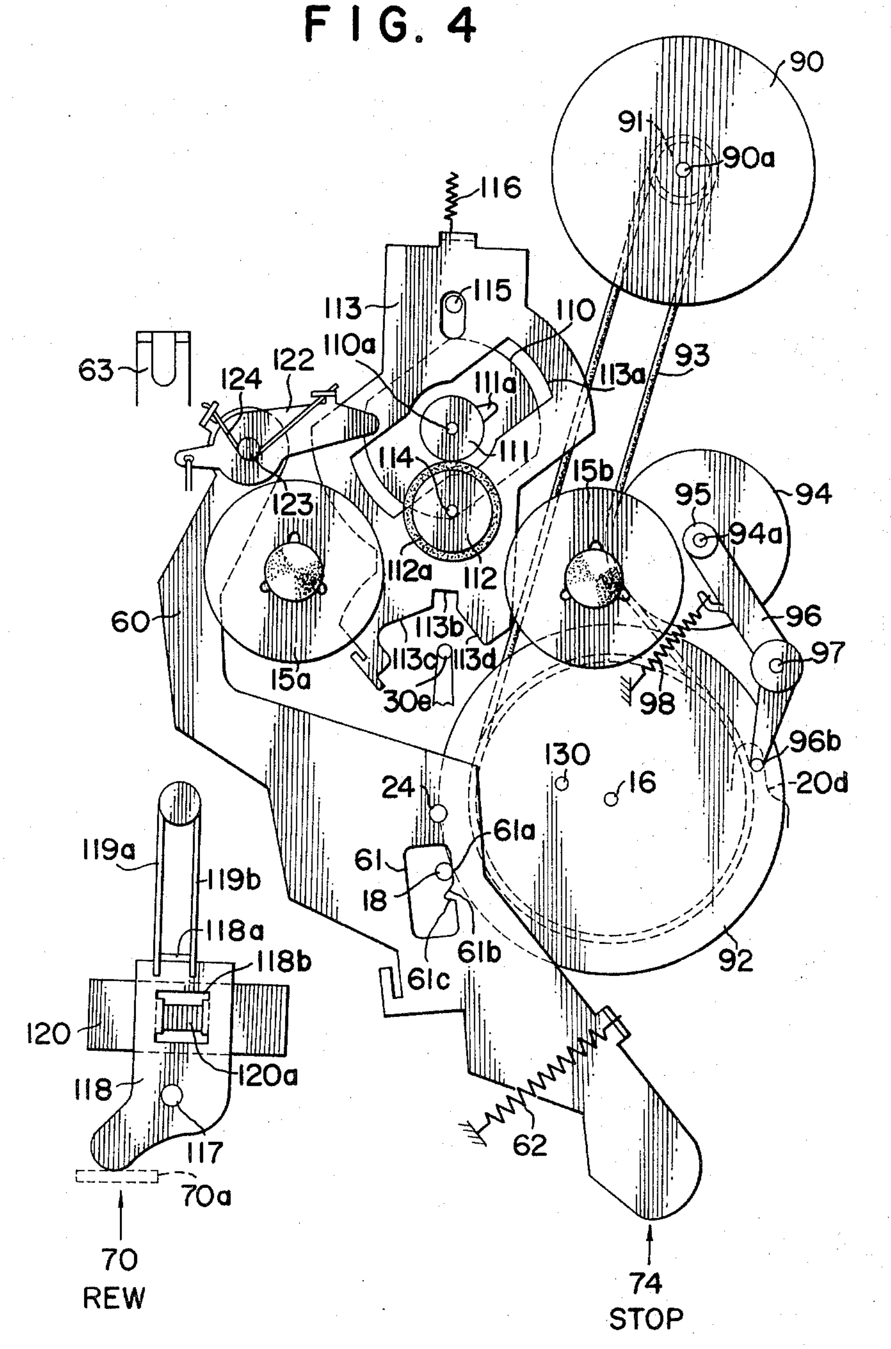
FIG. 4 is a plan view of the tape recorder with stationary, movable and frame members removed in order to show the passage for a tape from the cassette.

The movable member 20 further has a downwardly directed pin 24 at its central portion, on which a locking member 60 is mounted for movement between the stationary and movable members 10 and 20. As Shown in FIG. 4, the locking plate 48 has an opening 61 which is located beneath the pin 24 as seen in FIG. 4. The opening 61 is provided with a recess 61*a*, an outward projection 61*b* and a stepped portion 61*c* which are formed in series at the right side of the opening. A spring 62 is so disposed that it engages at one end with a lug formed at the right side edge of the lower portion of the member 60 and at the other end with the movable member 20. Thus, the locking member 60 is biased in the clockwise direction about the pin 24, the clockwise rotation of the locking member 60 being limited by a pin 18 secured to the stationary member 10 and adapted to be brought into abutting engagement with the recess 61*a*. The stationary member 10 has at its legt side upper portion an opening 10*c* as shown in FIG. 1 through which a lug portion of a recording inhibiting plate 63 is inserted to extend upwardly beyond the member 10.

Figure 6:
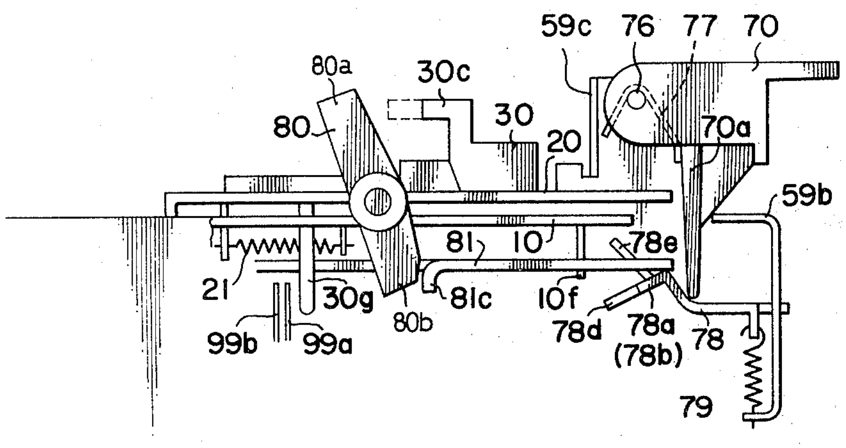
FIG. 6 is a fragmentary sectional view taken substantially along the line VI—VI in FIG. 1.

In FIGS. 1 and 2, there are further shown push button type operating members including a take back or wind back button 70, a fast advance button 71, a recording button 72, a play button 73, a stop button 74 and an eject button 75. The push buttons 70 through 75 are pivotally mounted on a common rod 76 which is supported at the opposite ends by an auxiliary member 59*b* and at its intermediate portions by a partition member 59*c*. A leaf spring 77 is bridged between the partition member 59*c* and each of the push buttons 70 through 75 across the rod 76 so as to bias the free end of each push button upwardly. The upward pivotal movement of the push buttons is limited by the intermediate portion of the auxiliary member 59*b* as shown in FIG. 6 which is a sectional view taken substantially along the line VI—VI in FIG. 1. As seen in FIG. 6, the push button 70 has a leg portion 70*a* which extends downwardly through an opening 10*d* in the stationary member 10 and abuts at its lower end a locking plate 78. As shown in FIG. 2, the locking plate 78 is rotatably supported at the opposite sides of the auxiliary member 59*b* and has projections 78*a* through 78*e* for co-operation with the leg portions 70*a* through 74*a* on the push buttons 70 through 74. The locking plate 78 is biased upwardly by a spring 79 extending between the locking plate 78 and the auxiliary member 59*b*. The movable member 20 is located just in front of the leg portion 70*a* so that it is possible to move the member 20 by depressing the push button 70. Similar arrangements are also made with respect to the other push buttons 71 through 74.

Referring to FIG. 1, when the push button 73 is depressed, the movable member 20 is upwardly displaced. In this instance, the locking plate 60 is rotated by means of the pin 18 in the counterclockwise direction about the pin 24 against the influence of the spring 62 as seen in FIGS. 3 and 4 and thereafter rotated clockwise by the action of the spring 62 until the stepped portion 61*c* abuts the pin 18. Thus, the movable member 20 is locked in position. The platform member 30 is also moved in the direction shown by X as a unit with the movable member 20 and locked in the position shown in FIG. 5. Thus, the pinch roller 50 co-operates with the capstan 16 to hold the tape 43 therebetween. The recording head 51 and the erasing head 52 engage the tape 43, and the detecting piece 53 also engage the tape 43 so as to deflect the tape. The playing position can be returned to the stop position by depressing the stop button 74 shown in FIGS. 1 and 2. Then, the locking plate 60 is pushed by the leg portion 74*a* on the push button 74 to rotate in the counterclockwise direction about the pin 24 against the action of the spring 62 to unlock the movable member 20 which is then moved under the influence of the spring 21 in the direction shown by Y in FIGS. 1 through 3.

When the take back push button 70 or the fast advance push button 71 is depressed, the movable member 20 is upwardly moved and locked in position by the leg portion 70*a* or 71*a* of the push button 70 or 71 which engages with the corresponding projection 78*a* or 78*b* of the locking plate 78. In this locked position of the movable member 20 and the platform member 30, the movable member 20 is not lifted to the height of the playing position. Therefore, the pinch roller 50, the recording head 51, the erasing head 52 and the detecting piece 53 are maintained apart from the tape 43.

In the illustrated embodiment, a provision is made to make it possible to move the head 51 and 52 and the pinch roller 50 apart from the tape under the playing position. For this purpose, an arm 80 is pivotally mounted between the auxiliary member 59a and the upwardly directed lug portion 10e of the stationary member 10, and the platform member 30 is provided with an upwardly directed lug portion 30c for cooperation with the arm 80. This arrangement is clearly shown in FIG. 6 in which the playing position is shown by dotted lines. A plate member 81 is disposed beneath the stationary member 10 and extends parallely therewith. The plate member 81 is vertically movably mounted by a downwardly directed lug portion 10f formed on the member 10 and a pin 82 secured to the member 10 as shown in FIG. 2. A spring 83 is disposed so as to bias the plate member 81 downwardly to urge the downward projections 81c and 81d on the member 81 toward the leg portions 71a and 70a of the push buttons 71 and 70. The plate member 81 has a depending lug portion 81e which co-operates with the lower portion of the arm 80 as shown in FIG. 6. Therefore, when the push button 70 or 71 is depressed in the playing position, the plate member 81 is displaced so as to move the roller 80 in the clockwise direction to push the platform member 30 toward the push buttons 70 and 71. Thus, in FIG. 3, it is possible to move the heads 51 and 52 and the pinch roller 50 apart from the tape 43 by making the platform member 30 to move in the counterclockwise direction.

It should be noted that according to the present invention the tape recorder includes two driving motors 90 and 110. The motor 90 is operated by a supply of D.C. electric power and mounted on an auxiliary member 19 which is in turn secured to the stationary member 10 at the right upper portion thereof. The motor 90 has a shaft 90a, as shown in FIG. 4, to which a motor pulley is secured. The capstan 16 is secured to the center of a fly wheel 92 which is drivingly connected with the motor pulley 91 through an endless belt 93. A take up pulley 94 is in engagement with the belt 93. The take up pulley 94 has a shaft 94a to which a pulley 95 is secured so as to rotate therewith. The pulley 95 extends upwardly as shown in FIG. 3 through the stationary member 10 for co-operation with the turn table 15b. The shaft 94a is rotatably connected to one end of an arm 96 which is rotatably supported at its intermediate portion by a depending pin 97 secured to the stationary member 10. The arm 96 is biased in the clockwise direction by means of a spring 98. At the other end of the arm 96, there is integrally formed an upwardly directed projection 96b which extends through an opening 10h in the stationary member 10 shown in FIG. 2 and an opening 20d in the movable member 20 to engage with the vertical side wall of the opening 20d. The opening 20d has a tapered side wall which is continuously formed with the vertical side wall so that, when the movable member 20 is moved in the X-direction, the projection 96b is displaced leftwardly in accordance with the configuration of the opening 20d under the influence of the spring 98. Thus, the pulley 95 is also moved toward left so that the pulley 95 is brought into contact with the turn table 15b under the playing position.

Figure 7:
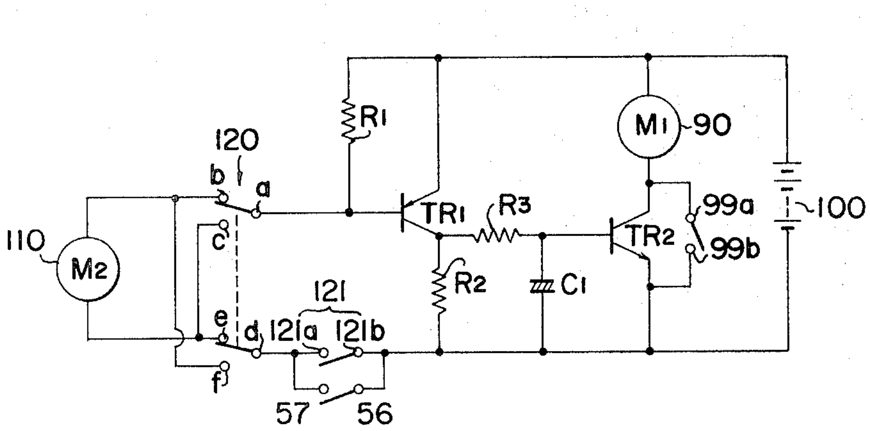
FIG. 7 is a circuit diagram.

Beneath the stationary member 10, there are disposed a pair of switches 99a and 99b as shown in FIGS. 2 and 6 for co-operation with a depending vertical portion 30g on the platfrom member 30 in such a manner that they are closed by the vertical portion 30g when the movable member 20 is moved to the playing position. Referring to FIG. 7, the switches 99a and 99b are connected between an electric power supply 100 and the motor 90. Therefore, when the switches are closed, the shaft 90a of the motor 90 is rotated counterclockwise. Thus, the capstan 16 is also rotated counterclockwise and the take up pulley 94 and the pulley 95 are rotated in the clockwise direction. Thus, under the playing condition, the turn table 15b is rotated in the counterclockwise direction so as to effect the constant speed advance of the tape 43.

Referring now to the fast advance and take back mechanism shown in FIGS. 3 and 4, the second D.C. motor 110 is mounted beneath the stationary member 10. The motor 110 has a shaft 110a which is located at a position equally spaced from the turn tables 15a and 15b. The shaft 110a has a motor pulley 111 secured thereto and extending upwardly through an opening 10i in the stationary member 10. The motor pulley 111 is in engagement with a rubber layer 112a secured to the periplery of an idler roller 112. The idler roller 112 is rotatably mounted on a shaft 114 provided at the center of a fast advance arm 113 which is in turn rotatably mounted on the stationary member 10 by a downwardly directed pin 115. The arm 113 is upwardly biased by means of a spring 116. The arm 113 is provided with a relatively large opening 113a through which the motor pulley 111 extends upwardly beyond the stationary member 10. The motor pulley 111 and the idler roller 112 are in the same plane as the turn tables 15a and 15b, and the idler roller 112 which is in contact at its rubber layer 112a with the pulley 111 and the spring 116 provide light resistance to the rotation of the motor pulley 111. The idler roller 112 can be moved transversely into contact with either one of the turn tables 15a and 15b. The arm 113 is provided at its lower end with a groove 113b and tapered sides 113c and 113d. The member 30 is provided at its center with a forwardly extending portion 30d which has a downwardly extending vertical end 30e for cooperation with the lower end of the arm 113. When the play button is depressed, the movable member 20 is upwardly and the vertical portion 30e is simultaneously moved into contact with either of the tapered surfaces 113c and 113d so as to rotate the arm 113. As the portion 30e is inserted into the groove 113b, the arm 113 is returned to the neutral position whereby the idler roller 112 is moved apart from the turn tables 15a and 15b.

Figure 8:
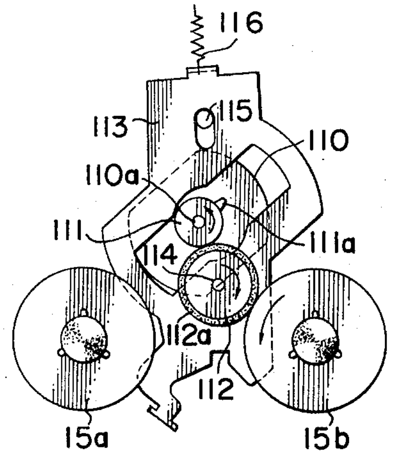
FIG. 8 is a plan view of a tape advancing mechanism which is shown in a fast advance position.
Figure 9:
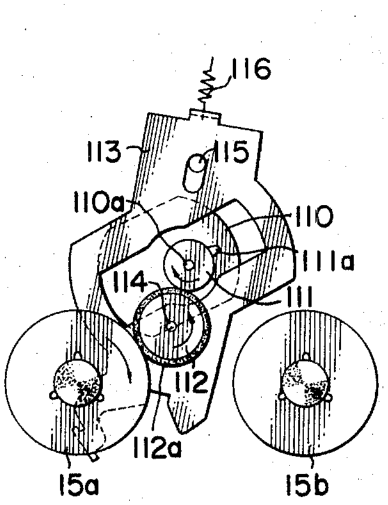
FIG. 9 is a plan view of the tape advancing mechanism shown in FIG. 8, the mechanism being shown in a taking back position.

A lever 118 is rotatably mounted on a pin 117 which is downwardly extending from the stationary member 10. The lever 118 has a bent portion 118a at its one end, on which two springs 119a and 119b act from the opposite sides thereof. The lever 118 is provided at its center portion with an opening 118b having depending lugs which engage a slide 120a of a switch 120. The lever 118 is in engagement at its other end with the leg portion 70a of the push button 70. Thus, when the take back button 70 is depressed, the lever 118 is rotated in the clockwise direction moving the slide 120a of the switch 120 rightwardly. When the push button 70 is released, the lever 118 and the slide 120a is returned to the original positions under the action of the spring 119a and 119b. As shown in FIG. 7, the slide switch 120 has terminal points *a*, *b*, *c*, *d*, *e* and *f*, and the points *a* and *d* are normally maintained in contact with the points *b* and *e*, respectively, but when the push button 70 is depressed, the movable contacts are shifted to connect the points *a* and *d* with the points *c* and *f*, respectively. The point *a* is connected through a resistor $R_1$ with one side of the power source 100, the points *b* and *e* with the opposite sides of the motor 110, the point *e* with the point *c*, and the point *f* with the point *b*. The terminal point *d* is connected through switches 121*a* and 121*b* with the other side of the power source 100. As shown in FIG. 2, the switches 121*a* and 121*b* are so arranged that they are closed when the plate member 81 is moved in the X-direction. Thus, the switches 121*a* and 121*b* constitute a power switch for the fast advance and take back operation. In other words, when the switch 121 is closed, the motor 110 is rotated for the fast advance or for the take back operation. During the fast advance operation, the shaft 110*a* of the motor 110 is rotated in the counterclockwise direction as seen in FIG. 4 while during the take back operation it is rotated in the clockwise direction. Referring to the fast advance operation, the motor pulley 110*a* is rotated in the counterclockwise direction as shown by an arrow in FIG. 8, so that the idler roller 112 is displaced toward right into contact with the turn table 15*b*. Thus, the turn table 15*b* is rotated at a faster rate in the counterclockwise direction for the fast advance of the tape. During the taking back or winding back operation, the motor pulley 110*a* is rotated in the clockwise direction as shown by an arrow in FIG. 9, so that the idler roller 112 is displaced toward left into contact with the turn table 15*a*. Thus, the turn table 15*a* is rotated at a faster rate in the clockwise direction.

Figure 5:
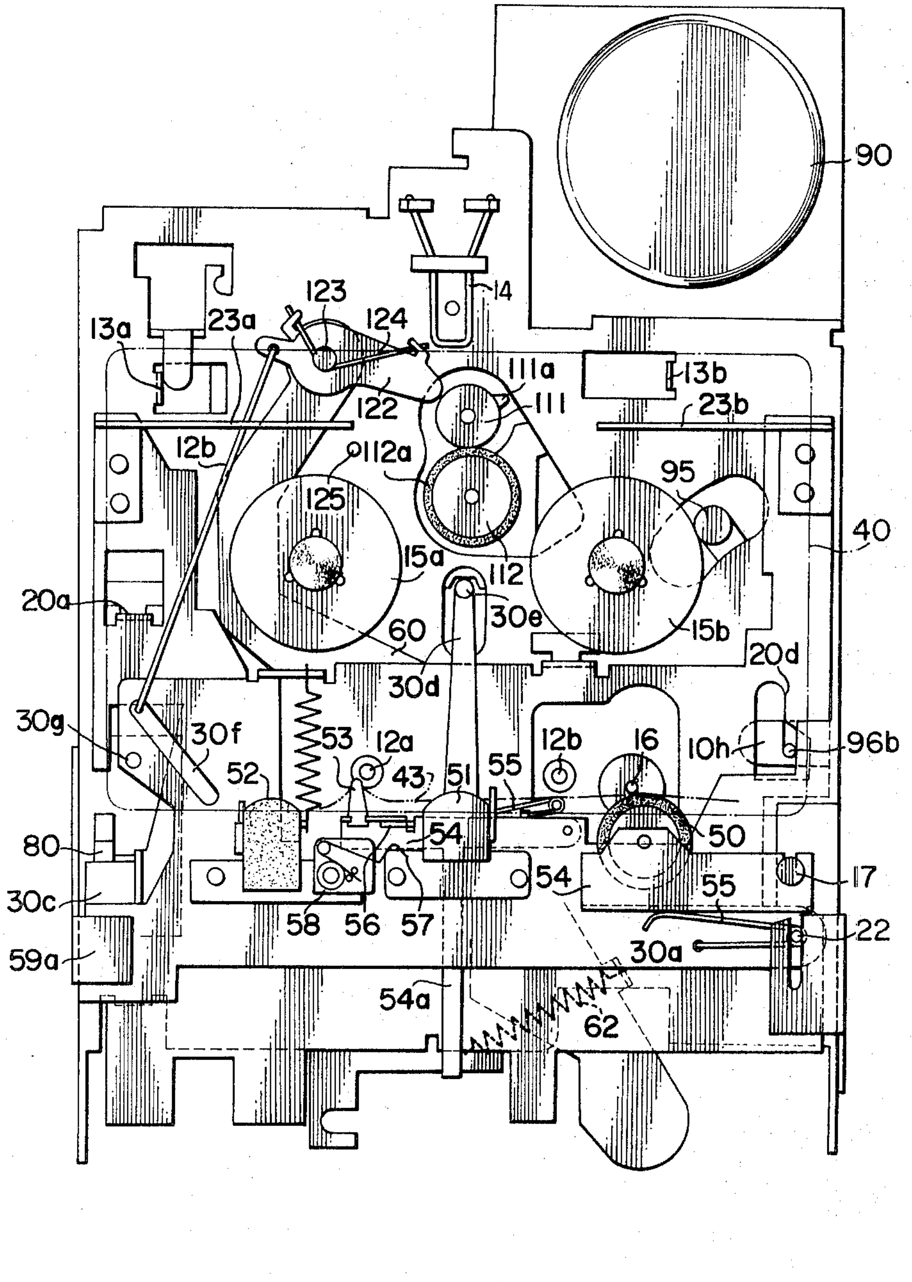
FIG. 5 is a plan view of the tape recorder similar to FIG. 3 but showing the recorder in a playing operation.
Figure 10:
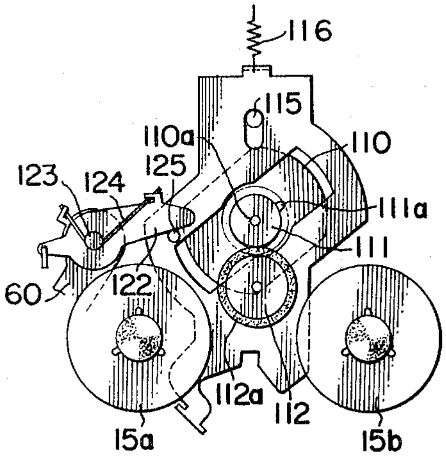
FIG. 10 is a plan view showing the relation between a cassette tape fast feed mechanism and an automatic stop lever in a stop position; and, FIG. 11 is a plan view similar to FIG. 10 but showing the parts in a constant speed advancing position.
Figure 11:
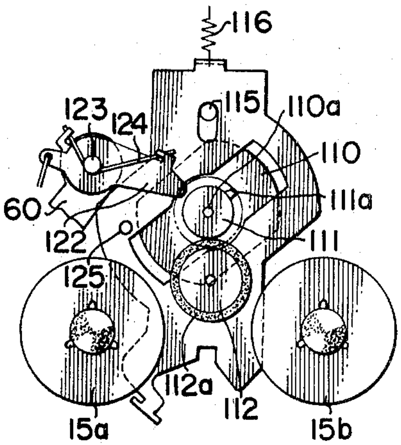

In order to obtain an automatic stop function, the motor pulley 111 is integrally formed at its lower end with a nail 111*a* which is located at a level lower than the rubber layer 112*a*. A rotatable lever 122 is pivotally mounted on the tip end portion of the locking lever 60 by means of a pin 123 provided thereon. A spring 124 is provided so as to act between the locking plate 60 and the lever 122 so as to bias the lever in the clockwise direction. The clockwise rotation of the lever 122 is limited by a stopper pin 125 as shown in FIG. 3. A rod member 126 is so disposed that it engages at one end the locking plate 60 and at the other end inserted beneath a slanted hole 30*f* in the platform member 30. At the stop position, the free end of the lever 122 is positioned outside the rotating plane of the nail 111*a* as shown in FIG. 10. When the play button is depressed, the member 30 shown in FIG. 3 and the locking plate 60 are moved in the X-direction. Thus, the lever 122 is moved apart from the pin 125 and the rod member 126 is guided outwardly along the slanted hole 30*f* so as to force the lever 122 into a position in which the tip end of the lever 122 is positioned in the plane of rotation of the nail 111*a* on the pulley 111. Therefore, within a full turn of the nail 111*a*, the lever 122 is pushed outwardly to move the locking plate 60 into the unlock position. A tape end can be detected by the movement of the detecting piece 53. During the playing operation, the tape 43 is normally deflected by the detecting piece 53 as shown in FIG. 5. However, when the tape 43 is exhausted, it is stretched to displace the detecting piece 53 outwardly against the action of the spring 55 to a position in which the printed board 56 contacts with the wire 57. The printed board 56 and the wire 57 constitute a switch which is arranged in parallel with the switch 121. Therefore, the motor 110 is started when the circuit board 56 is brought into contact with the wire 57. Referring to FIG. 4, when the shaft 110*a* of the motor 110 is rotated, the motor pulley 111 is simultaneously rotated whereby the nail 111*a* on the pulley engages with the lever 122 within its full turn to push it outwardly. Thus, the locking plate 60 is moved to the unlock position and therefore the movable member 20 is moved downwardly to the stop position.

For automatically stopping the motor during the fast advance or wind back operation, a pair of transistors $TR_1$ and $TR_2$ are used in the circuit shown in FIG. 7. The transistor $TR_1$ is connected at its base with the terminal point *a*, at the emitter with one side of the power source 100, and at the collector through a resitor $R_2$ with the other side of the power source. During the operation of the motor 110, the transistor $TR_1$ is cut-off. The collector of the transistor $TR_1$ is connected through a resistor $R_3$ and a capacitor $C_1$ with the base of the transistor $TR_2$. The collector and the emitter of the transistor are connected to terminal points 99*a* and 99*b* of a switch. As shown in FIG. 2, the flywheel 92 has a pin 130 secured thereto and a pivotable lever 131 is mounted on a pin 132 secured to the stationary member 10. A spring 133 is supported at its intermediate portion around a pin 11 on the stationary member 10 and has one end secured to the plate member 81 and the other end acting on the lever 131. The lever 131 has one end 131*a* located outside the plane of rotation of the pin 130 and the other end 131*b* having a slanted member 134 secured thereto. The member 134 is disposed in the opposite relation to a stopper projection 78*e* on the locking plate 78 and tapered toward the projection 78*e*. During the fast advance or wind back operation, the plate member 81 is moved upwardly so that the lever 131 is pivoted until the end 131*a* is positioned in the plane of rotation of the pin 130. Further, the member 134 is positioned closer to the projection 78*e*. When the tape 43 reaches its end, the motor 110 is subjected to an increased load so that the motor current is increased. Thus, the transistor $TR_1$ in the circuit shown in FIG. 7 is turned on and thereafter the transistor $TR_2$ is also turned on so as to allow electric current to flow through the motor 90. Therefore, the flywheel 92 shown in FIG. 2 is rotated and causes the pin 130 to push the lever 131 outwardly. In this instance, the slanted member 134 displaces the projection 78*e* to unlock the leg portion 71*a* or 70*a* on the push button 71 or 70 to return it to the stop position.

When the cassette 40 is positioned as shown in FIG. 40 with its tape 43 fully taken up and operator pushes the play button 73 without knowing the fact, the detecting piece 53 is in the displaced position even in this circumstance so that the printed board 56 may be in contact with the wire 57. Thus, the motor 110 may be started to rotate the motor pulley 111. Thereafter the lever 122 may be brought into the plane of rotation of the nail 111*a* and produce a noise due to the abutting engagement with the nail 111*a*. In order to avoid this problem, the arm 54 supporting the detecting piece 53 is provided with a vertical extension 54*a* which extends toward the push button and has a tip end provided with a depending lug 54*b*. The play button 73 is provided on its leg portion 73*a* with a transversely extending leaf spring 135 which is upwardly bent to form a lug 135*a*. When the play button 73 is depressed, the lug 54*b* on the extension 54*a* of the lever 54 abuts the leaf spring 135 so that the leaf spring 135 engages at its lug 135*a* the detecting piece 53. Thus, even when the detecting piece 53 is pushed by the tape 43, it is locked in position against movement. Therefore, it is possible to prevent the motor 110 from being started and the noise from being produced.

The operation of the tape recorder shown in the drawings will not be described. For playing operation the play button 73 is merely depressed. Then, the movable member 20 is displaced toward the direction X, and the brake elements 23*a* and 23*b* are moved apart from the turn tables 15*a* and 15*b*. In this instance, the locking plate 60 is locked by the pin 18 of the stationary member 10. The platform member 30 is also displaced in the direction X together with the movable member 20 whereby the switches 99*a* and 99*b* are closed by the lug 30*f*. Thus, the motor 90 is started and the capstan 16 is rotated counterclockwise. The rotation of the capstan 16 is transmitted through the belt 93, the idler roller 94 and the rubber pulley 95 to the turn table 15*b* to rotate it in the counterclockwise direction at a constant speed. Thus, the tape is advanced at a constant speed for the playing operation.

When the full length of the tape is fed, the detecting piece 53 is displaced outwardly as previously described under the influence of increased tape tension, so that the printed board 56 is brought into contact with the wire 57. Then, the motor 110 is energized and the nail 111*a* of the motor pulley 111 serves to push the lever 122 outwardly to unlock the locking plate 60. Thus, the tape is automatically stopped.

When it is desired to advance the tape at a faster rate during the playing operation, the push button 71 is depressed. Then, the plate member 81 actuates the arm 80 so that the member 30 is rotated counterclockwise about the pin 22, with the result that the heads 52 and 51 and the pinch roller 450 are moved apart from the tape 43, and the switches 99*a* and 99*b* are opened. At the same time, the plate member 81 closes the switches 121*a* and 121*b* so that the motor 110 is rotated in the counterclockwise direction. Thus, the idler roller 112 is moved into contact with the turn table 15*b* to rotate it counterclockwise at a higher rate. When the push button 71 is released, it is returned to the original position under the influence of the leaf spring 77 and the plate member 81 is also returned to its normal position by the spring 21, whereby the switches 121*a* and 121*b* are opened. The member 30 is also returned under the action of the spring 32 to close the switches 99*a* and 99*b*. Thus, the normal playing operation is continued.

When it is required to wind back a certain length of tape during the playing operation, the push button 70 is simply depressed. Then, the motor 110 is started just like in the preceeding descriptions. In this instance, however, since the switch 120 is actuated by the push button 70, the motor 110 is rotated clockwise. Thus, the turn table 15*a* is rotated clockwise at a higher rate.

For the fast advance of the tape, the push button 71 is depressed. Then, the leg 71*a* of the push button 71 is locked by the lug 78*a* on the locking plate 78. The movable member 20 is moved in the direction X but not so far as in the playing operation. The plate member 81 is displaced and the fast tape advance is performed as in the previous description. For the take back or wind back operation, the push button 70 is depressed. Then, the leg 70*a* on the button 70 is locked by the lug 78*a* on the locking plate 78. Thus, the wind back operation is performed as previously described.

When the full length of tape is fed during the fast advance or winding back operation, the tape tension is abruptly increased resulting in an increase in the load on the motor. Thus, the motor current is increased to the level under which the transistors $TR_1$ and $TR_2$ are turned on to make the motor 90 to rotate by an angular extent of 90° During the fast advance or the wind back operation, the plate member 81 is displaced to pivot the lever 131 so that the end 131*a* of the lever 131 is brought into the plane of rotation of the pin 130. Thus, as the motor 90 rotates, the flywheel 92 and the pin 130 are rotated to push the lever 131 outwardly. In this instance, the slanted member 134 on the lever 131 engages with the locking plate 78 to displace it, so that the motor is automatically stopped. If the tape in a cassette is in a fully taken up position when the cassette is mounted on the tape recorder, the detecting piece 53 may be forced outwardly, but since the detecting piece 53 is restricted its movement, the motor 110 is not started.

Thus, according to the present invention, the fast advance and wind back operations are performed by a separate motor provided for the purposes and the rotation of the motor is transmitted through a motor pulley and an idler roller, so that the required operations can be achieved by a simple mechanism which is less expensive and easy to assemble. The motor provided for the fast advance and wind back may be of a relatively less expensive one as compared with the motor for the playing operation because the former is not required to rotate at a precisely controlled speed. Thus, the cost of the tape recorder can be decreased as a whole. The relative construction also contributes in decreasing the number of discrepant products.

Since the automatic stop during the constant speed operation is performed by using the motor for the fast advance and wind back operation, the structure can be made very simple and easily assembled. It is a particular significance of the present invention that the motor can be automatically stopped even during the fast advance and winding back operations. This function is achieved through the action of the playing motor. Thus, the novel function can be additionally attained without providing any additional part. The illustrated embodiment is further advantageous in that a certain length of the tape can be advanced or wound back at a faster rate even in the playing operation and that any trouble can be avoided when a cassette is mounted on the recorder with its tape fully taken up and the operator depresses the playing button without noting the fact.

The invention has thus been shown and described with respect to a preferred embodiment, however, it should be noted that the invention is in no way limited to the details of the illustrated structures and that many changes and modifications can be made without departing from the scope of the appended claims.

We claim:

1. A cassette tape recorder comprising
1. a first and a second motors;
2. a supply side and a take up side turn tables;
3. first means for rotating said first motor in playing operation of said recorder so as to effect a constant speed advance of a cassette tape into said take up side turn table; and 4. second means for rotating said second motor in fast advance or wind back operation of said recorder so as to effect a fast advance or wind back of the cassette tape into said take up or supply side turn table.

2. A cassette tape recorder in accordance with claim 1 which further comprises 5. third means for rotating said second motor when the end of the tape is reached during the constant speed advance of the tape for terminating the constant speed advance of the tape.

3. A cassette tape recorder in accordance with claim 2 which further comprises 6. fourth means for rotating said first motor when the end of the tape is reached during the fast advance or wind back of the tape for terminating the fast advance or wind back operation.

4. A cassette tape recorder in accordance with claim 1 in which said second means includes i. a motor pulley secured to the shaft of said second motor, and ii. a pulley which is in contact with said motor pulley and brought into driving engagement with said taking up turn table during the fast advance operation and with the supplying turn table during the winding back operation.

5. A cassette tape recorder in accordance with claim 2, in which;

said second means has a motor pulley secured to the shaft of said second motor; and said third means has a member which is brought in the plane of rotation of said motor pulley during the constant speed advance operation and out of said plane during the fast advance or wind back operation, whereby the constant speed advancing operation can be terminated when the end of the tape is reached during the constant speed advance operation by rotating the motor pulley so as to displace said member outwardly.

6. A cassette tape recorder comprising 1. a first and a second motors;
2. a supply side and a take up side turn tables;
3. push button means including a play button, a fast advance button and a wind back button;
4. a movable member slidably moved when the play button is depressed;
5. a locking member pivotally mounted on said movable member;
6. a locking pin for displacing said locking member so as to bring one end of the locking member or a lever pivotally mounted thereon to the plane of rotation of a motor pulley secured to the shaft of said second motor when the play button is depressed;
7. means for rotating said first motor when the locking member is locked so as to effect a constant speed advance of a cassette tape into said takeup side turn table;
8. means for detecting an end of the cassette tape during the constant speed advance thereof; and
9. means for rotating said second motor when the end of the tape is detected so as to displace the locking member or said lever outwardly by said motor pulley to unlock the locking member.

7. A cassette tape recorder in accordance with claim 6 which further comprises 10. a locking plate for locking the fast advance or wind back button in the depressed position;
11. means for rotating said second motor when the button is locked for rotating the motor pulley;
12. a pulley disposed in contact with said motor pulley and brought into engagement in response to the rotation of the motor pulley with the take up side turn table when the fast advance button is depressed and with the supply side turn table when the wind back button is depressed for rotating the turn table at a faster speed;
13. detecting means for detecting the end of the tape during the fast advance or wind back operation; and
14. means for terminating the fast tape advance or wind back operation when the tape end is detected by rotating the first motor.

8. A cassette tape recorder in accordance with claim 7 in which said detecting means causes increase in motor current.

9. A cassette tape recorder in accordance with claim 7 in which said last mentioned means includes i. a pin provided on a flywheel which is rotated during the constant speed advance of the cassette tape; and ii. a lever having one end adapted to be located in the plane of rotation of said pin during fast advance of the cassette tape and the other end opposed to said locking plate, said lever being adapted to be pushed outwardly by said pin when said first motor is rotated as the tape end is reached, so as to make the locking plate unlock the push button.

* * * * *